(12) United States Patent
Bullock

(10) Patent No.: US 7,329,074 B2
(45) Date of Patent: Feb. 12, 2008

(54) CROSS-WEAVE CARGO RESTRAINT SYSTEM AND METHOD

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 11/380,142

(22) Filed: Apr. 25, 2006

(65) Prior Publication Data

US 2006/0198712 A1 Sep. 7, 2006

Related U.S. Application Data

(62) Division of application No. 10/730,042, filed on Dec. 9, 2003, now Pat. No. 7,066,698.

(51) Int. Cl.
B60P 7/08 (2006.01)
(52) U.S. Cl. ............................ 410/97; 410/34; 410/100
(58) Field of Classification Search ................. 410/32, 410/34, 36, 42, 96–97, 100, 155; 220/1.5; 206/410, 597; 53/399, 441, 462, 556; 248/499
See application file for complete search history.

(56) References Cited

U.S. PATENT DOCUMENTS

| | | |
|---|---|---|
| 2,269,286 A | 1/1942 | Ott |
| 3,547,457 A | 12/1970 | Langer |
| 3,612,463 A | 10/1971 | Grant |
| 3,848,889 A | 11/1974 | Sharrow |
| 3,897,919 A | 8/1975 | Weingarten |
| 3,910,558 A | 10/1975 | Brucker et al. |
| 4,054,226 A | 10/1977 | Bjelland et al. |
| 4,111,132 A | 9/1978 | Plut |
| 4,264,251 A * | 4/1981 | Blatt .......................... 410/100 |
| 4,553,888 A | 11/1985 | Crissy et al. |
| 4,640,853 A | 2/1987 | Schmeal et al. |
| 4,846,610 A | 7/1989 | Schoenleben |
| 4,964,771 A | 10/1990 | Callihan |
| 5,037,256 A | 8/1991 | Schroeder |
| 5,062,751 A | 11/1991 | Liebel |
| 5,132,156 A | 7/1992 | Trussare, Jr. et al. |
| 5,139,842 A | 8/1992 | Sewell |
| 5,431,284 A | 7/1995 | Wilson |
| 5,484,643 A | 1/1996 | Wise et al. |
| 5,516,244 A | 5/1996 | Baka |

(Continued)

FOREIGN PATENT DOCUMENTS

EP 1184436 A1 3/2002

(Continued)

OTHER PUBLICATIONS

"Hexacomb kraft honeycomb: Pactiv Panels" Sales Brochure, Copyright 1996.

*Primary Examiner*—Stephen Gordon
(74) *Attorney, Agent, or Firm*—Bradford Kile; Kile Goekjian Reed & McManus PLLC

(57) ABSTRACT

A cross-weave load restraint system and method for securing cargo within transport containers including first and second load restraining strips wherein the first strip is formed with a cross-weave material and the second strip is composed of parallel strands of reinforcement materiel. The first and second strips of reinforcement material are secured together with an adhesive layer and a second layer of adhesive is provided for attaching the cross-weave load restraining strip to an interior surface of a transport container.

23 Claims, 5 Drawing Sheets

U.S. PATENT DOCUMENTS

| | | |
|---|---|---|
| 5,568,636 A | 10/1996 | Koford |
| 5,595,315 A | 1/1997 | Podd et al. |
| 5,784,761 A | 7/1998 | Allen |
| 5,846,038 A | 12/1998 | Bostelman |
| 5,855,459 A | 1/1999 | Krier et al. |
| 5,947,666 A | 9/1999 | Huang |
| 6,089,802 A | 7/2000 | Bullock |
| 6,227,779 B1 | 5/2001 | Bullock |
| 6,368,036 B1 | 4/2002 | Vario |
| 6,419,434 B1 | 7/2002 | Rahn |
| 6,435,787 B1 | 8/2002 | John |
| 6,527,488 B2 | 3/2003 | Elze et al. |
| 6,533,513 B2 | 3/2003 | Kanczuzewski |
| 6,607,337 B1 | 8/2003 | Bullock |
| 6,702,532 B1 | 3/2004 | Throener |
| 6,758,644 B1 | 7/2004 | Vick |
| 7,066,698 B2 * | 6/2006 | Bullock ........................ 410/97 |
| 2003/0206782 A1 | 11/2003 | Toglia |

FOREIGN PATENT DOCUMENTS

| | | |
|---|---|---|
| WO | WO09301979 A1 | 2/1993 |

* cited by examiner

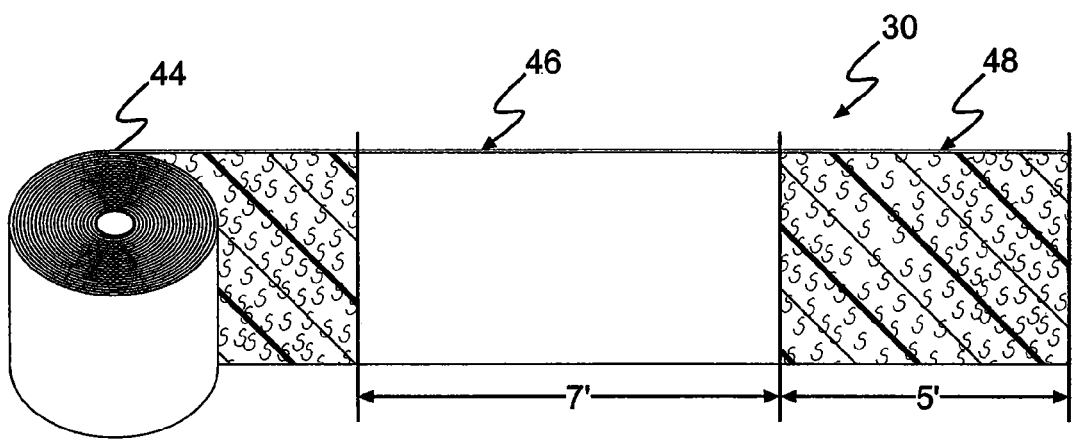
FIG. 3
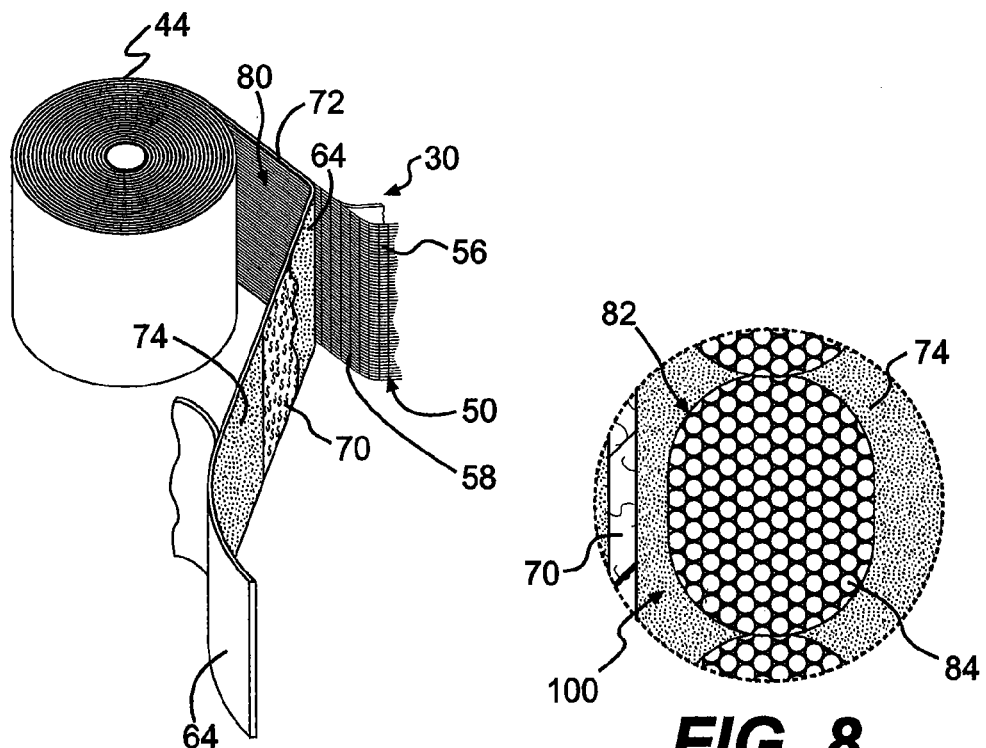
FIG. 4
FIG. 8

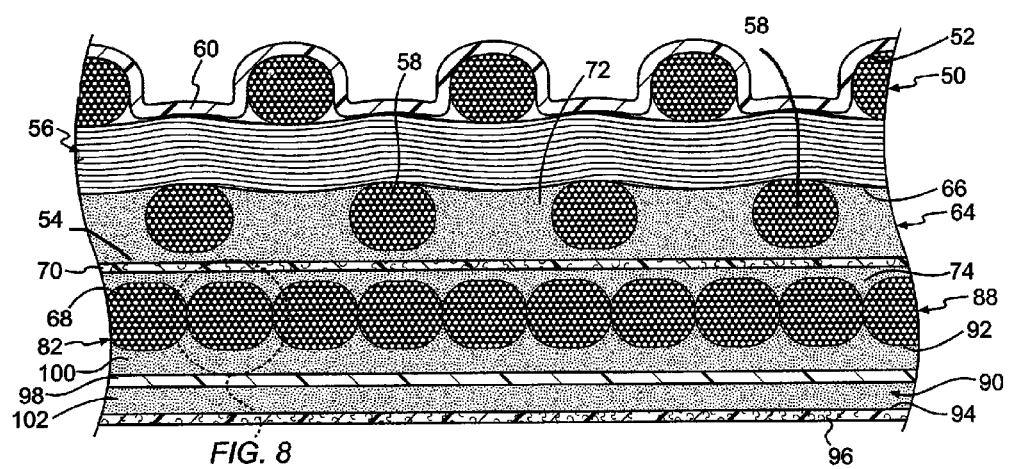

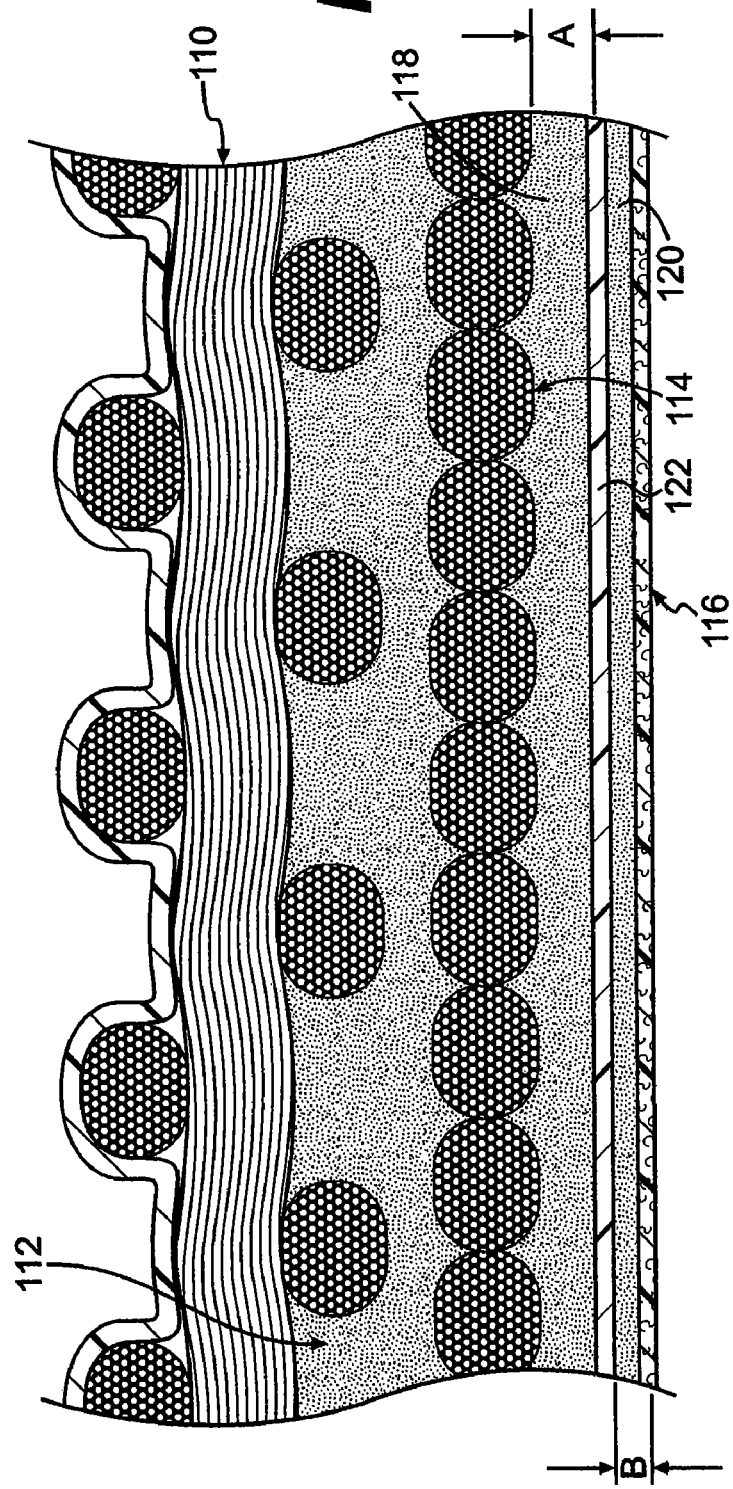

CROSS-WEAVE CARGO RESTRAINT SYSTEM AND METHOD

RELATED PATENTS

This application is a divisional of U.S. application Ser. No. 10/730,042 filed Dec. 9, 2003, now U.S. Pat. No. 7,066,698 "Cross-Weave Cargo Restraint System" and relates to U.S. Pat. No. 6,089,802 entitled "Cargo Restraint System for a Transport Container" issued on Jul. 18, 2000, U.S. Pat. No. 6,227,779 entitled "Cargo Restraint Method for a Transport Container" issued on May 8, 2001, and U.S. Pat. No. 6,607,337 entitled "Cargo Restraint System" issued on Aug. 19, 2003, all of common inventorship and assignment as the subject application.

BACKGROUND OF THE INVENTION

This invention relates to an improved system and method for restraining cargo during transportation. More particularly, this invention relates to a novel system and method for securing and restraining undesired movement of drums, boxes, rigid and flexible containers, palletized or not palletized, within the interior of a truck body, a railroad car, an intermodal container, and the like. Moreover this invention relates to a system and method of enhanced securement strength and reduction of load shifting during transport.

In the United States most overland shipping is accomplished using either a tractor/trailer truck combination, often referred to descriptively as an eighteen wheeler, or via railroad boxcars and/or truck trailers mounted on flatcars. Truck trailers are typically forty five, forty eight or fifty three feet in length and are often loaded with cargo in containment enclosures such as fifty five gallon closed head drums, super sacks or plastic reinforced bags, plastic wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a truck or rail car is placed in motion.

Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

In addition to the above discussed overland shipping, most shipments for export, both in the United States and abroad, are placed into intermodal containers. These containers have standardized dimensions of twenty or forty feet in length and are fabricated with steel, corrugated sidewalls which are structurally self-supporting and rugged. Several intermodal containers may be stacked on top of each other for transport by sea, rail, or road. Within the containers, drums, boxes, etc. hold actual product as noted above.

The cargo of these intermodal containers experience various forces throughout the course of transport as noted above in connection with overland transport, such as, acceleration, centrifugal loads, braking, vibration, etc. as noted above. In addition, intermodal containers, when loaded onto ships for ocean transport, are subjected to wave forces including: yaw, pitch, heave, sway, and surge. Each of these forces has the potential to impart a substantial force onto the contents within an intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

When cargo contacts the interior walls or doors of a container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage the load containment enclosures are often secured to the floor and/or sides of the trailer or boxcar by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with rear doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized.

In the past, various dunnage materials have been utilized within trailers and/or intermodal containers to eliminate unwanted movement or shifting of a load during transport. The drums, boxes, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked in a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing of conifer wood dunnage. In this the International Plant Protection Convention ("IPPC") has issued "Guidelines for Regulating Wood Packaging Material in International Trade" having specific sections, requirements and limitations with respect to wood dunnage that has been accepted by numerous countries including the United States.

The Department of Transportation has established a standard to determine if a particular restraint system is capable of adequately securing hazardous cargo. In certain instances, conventional load-locking and lumber bracing has not received approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and intermodal containers that is functionally effective, cost-efficient, labor-efficient, and able to comply with Department of Transportation and Bureau of Explosives regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and a joining mechanism are used to bind the ends of the strips together into a secure and taut restraint.

In the '251 patent, flexible securement strips are applied in a manner similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779 and 6,607,337 all of common inventorship and assignment as the subject application. The disclosures of these prior four patents, of common assignment as the subject application, are hereby incorporated by reference as though set forth at length.

Further to these prior systems of securing lading in truck trailers, railroad cars, and intermodal containers increasing attention has been placed on securing heavier and denser loads, including hazardous materials, without abandoning the advantages achieved by previously known commercial systems. Moreover, there is interest in decreasing the elastic and/or plastic elongation and enhancing the vertical securement function so that hazardous materials can be transported with enhanced efficiency and security. In this regard it would be desirable to utilize an eighty, fifty five gallon, drum load within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors is not acceptable by HazMat regulations.

In addition to the above, other restraining systems known in the past required multiple elements which were cumbersome to store, were arduous to install, and often required a degree of skilled labor. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within a truck trailer, boxcar, intermodal container, or the like, which will obviate or minimize problems and concomitantly achieve at least some of the desired aspects of lading securement of the type previously described.

It is another general object of the subject invention to judiciously protect cargo from damage during transport and to provide enhanced vertical, as well as lateral, securement of a load within a container.

It is a specific object of the invention to provide a securement system and method for a tractor trailer, boxcar, intermodal container, and the like, with enhanced strength to restrain a load in position during impact and/or other transport forces.

It is a related object of the invention to provide a securement system and method for a tractor trailer, boxcar, intermodal container, and the like, where the amount of load travel for a given level of impact is minimized.

It is another object of the subject invention to reduce the material and labor costs involved in securing lading within a trailer, boxcar, intermodal container, and the like.

It is yet another object of the subject invention to provide a system capable of restraining eighty, fifty-five gallon drums, double stacked, in a forty foot intermodal container capable of receiving Department of Transportation and Bureau of Explosives approval.

It is a particular object of the subject invention to provide a method for securing cargo that is self-contained and may be installed quickly, reliably, and efficiently by relatively unskilled labor, even in intermodal containers having corrugated walls.

It is another object of the subject invention to provide for efficient and simple removal of the securing system from a trailer truck, boxcar, intermodal container, or the like, at a cargo destination.

It is still a further object of the subject invention to provide a system for restraining cargo that is able to withstand a wide range of temperatures and levels of humidity to enable effective use in a wide range of climates.

BRIEF SUMMARY OF THE INVENTION

One preferred embodiment of the invention, which is intended to accomplish at least some of the foregoing objects, comprises a load restraining strip preferably having a layer of generally parallel reinforcement strands applied to an outside surface of said first layer of adhesive and a layer of cross-weave reinforcement strands bonded to the other surface of said first layer of adhesive. A second layer of adhesive extends in intermittent lengths of five feet, or so, along the outside surface of the generally parallel reinforcement strands and operably serve to bond the load restraining strip to an interior surface of a cargo transport container such as a truck trailer side wall, a railroad boxcar interior wall surface, an intermodal container interior wall, or the like.

A polyethylene coated release paper layer is applied on the outside surface of the second layer of adhesive and the release paper is removed on site so that an installer can facilely apply the load restraining strip to an interior wall surface of a container.

In use, a length of a cross-weave, load restraining strip, typically twelve feet, is cut from a reel and the five foot length of release paper is peeled away. Next, the exposed face of the second layer of adhesive is self-adhered to an interior sidewall surface of a transport container such as a tractor-trailer, boxcar, intermodal container, or the like.

An identical second strip is applied to an opposing surface of the container in a mirror image posture and the free ends of the two load restraining strips are wrapped around goods to be secured within the container. The ends of opposing strips are overlapped at a center location around the load. A tensioning tool is then used to wind the two lapped ends together to draw the opposing load restraining strips taut around the load. A third, shorter piece of the strip material, is cut from a separate roll of patch material and its release paper is removed. This shorter patch strip is adhered to the exposed surfaces of the two load restraining strips at the joint. The shorter patch piece thus locks the strips in place and forms a secure load restraining system.

THE DRAWINGS

Other objects and advantages of the present invention will become apparent from the following detailed description of preferred embodiments taken in conjunction with the accompanying drawings wherein:

FIG. 3 is a pictorial view of the present invention showing a dispensing roll and a typical length of a securement restraining strip of enhanced strength, reduced elongation and vertical securement under impact loading in accordance with a preferred embodiment of the invention;

FIG. 4 is an axonometric view of a preferred embodiment of the securement strip as disclosed in FIG. 3 which has been partially redacted and broken away to disclose interior detail of the strip in accordance with one embodiment of the subject invention;

FIG. 7 is an enlarged detail, sectional view taken along section line 7-7 in FIG. 5;

FIG. 8 is an enlarged circular view taken from FIG. 7; and

FIG. 9 is a view similar in nature to FIG. 7, however, disclosing an alternative preferred embodiment of the invention showing a differential adhesive thickness in accordance with the subject invention.

DETAILED DESCRIPTION

Context of the Invention

Figure 1:
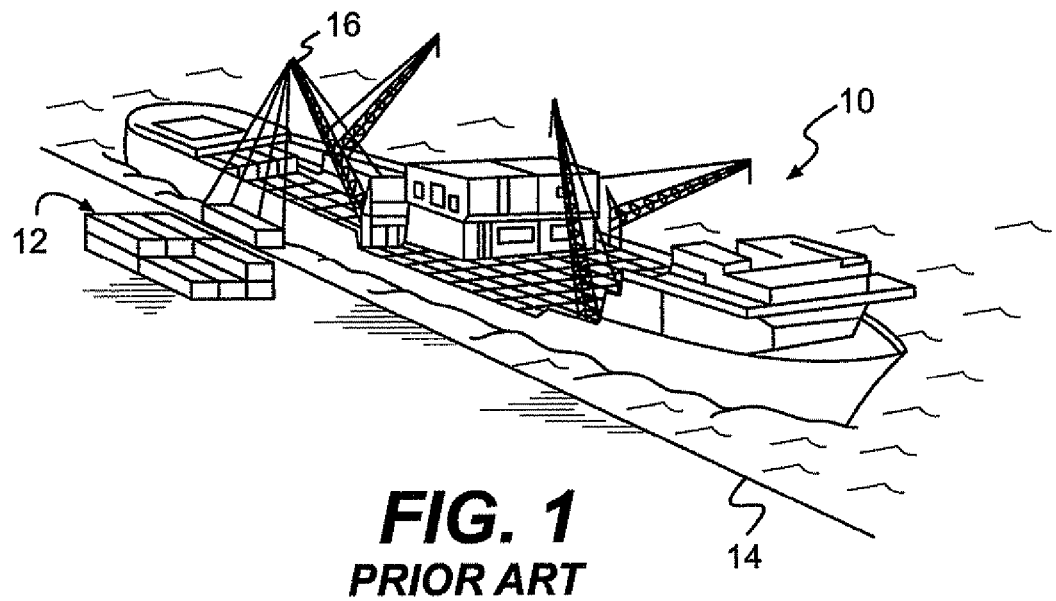
FIG. 1 is an aerial view of a ship at a dock with cranes lifting and loading intermodal containers onto the ocean going vessel.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 and cranes 16 are lifting and loading the intermodal containers 12 to be stacked on the ocean going vessel 10. The subject invention may be advantageously used to secure cargo within the intermodal containers 12, like the ones being loaded onto the ship 10.

Figure 2:
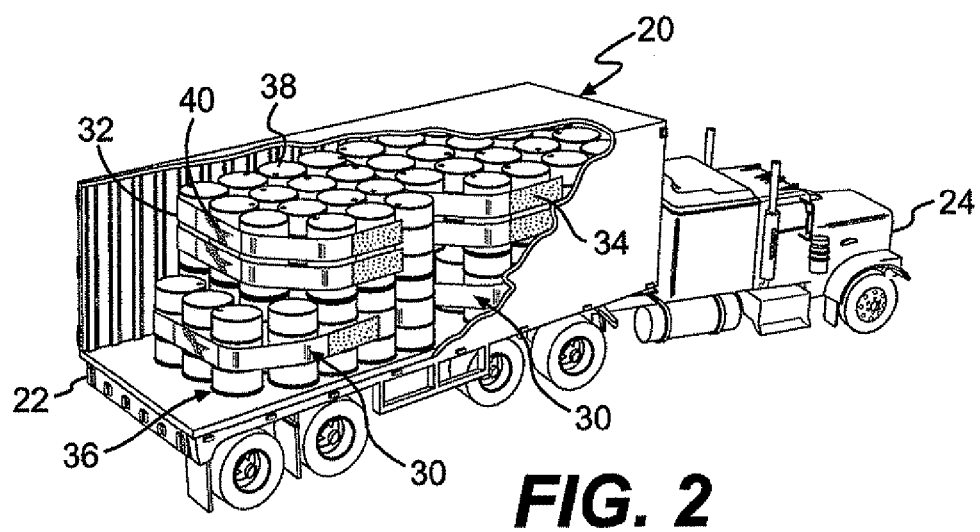
FIG. 2 is an axonometric view showing the interior of a truck trailer, or an intermodal container secured to a flatbed truck, with a partial load secured within the container.
Figures 5, 6:
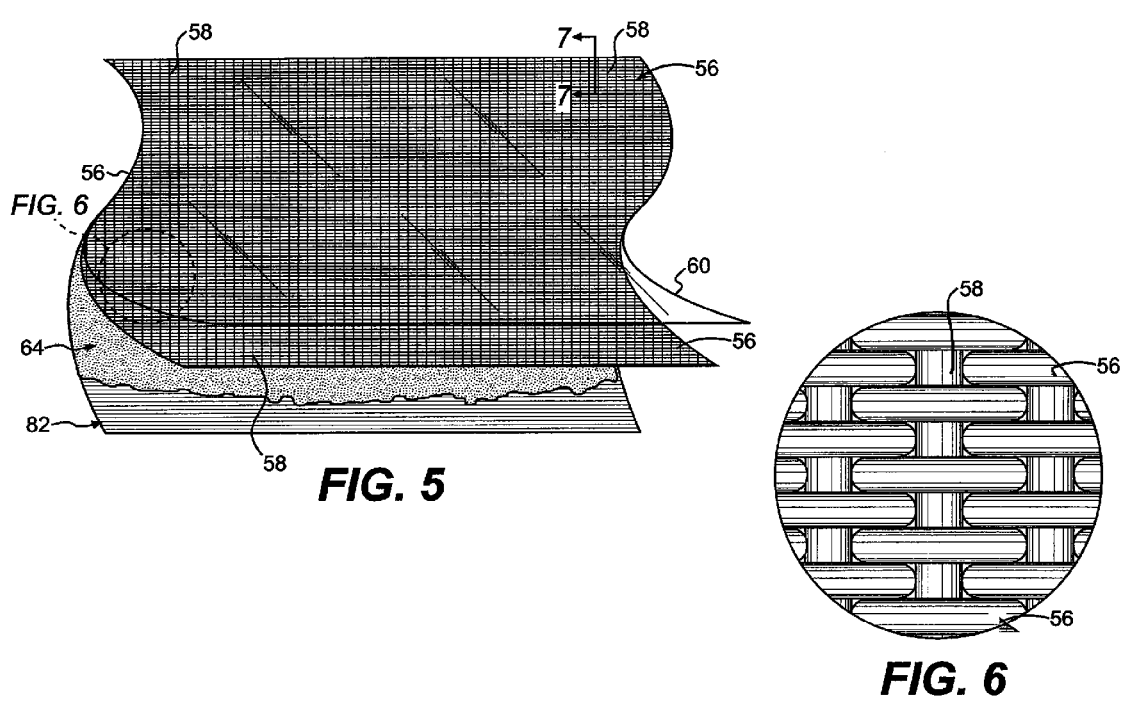
FIG. 5 depicts a partial, broken away view of a section of cross-weave material forming a part of a preferred embodiment of the securement strip.
FIG. 6 is a detailed pictorial view of a circular segment of the cross-weave material as shown in FIG. 5.

FIG. 2 is an axonometric view that discloses the invention in another illustrative operating environment. In this view an intermodal or cargo container 20 is shown mounted upon a trailer 22 which is operably towed by a tractor 24 for land transport. Containers such as these are also operable to be mounted on railway flat cars either directly or attached to trailers 22. Other environments in which the subject invention is equally suitable for use includes railroad boxcars, and the like, not shown.

A partially cut away portion of FIG. 2 depicts a cargo restraining strip 30, in accordance with the invention, which is operable to be adhered to an interior wall surface 32 of the cargo container 20. The cargo securement system of the subject invention comprises a pair of opposing restraining strips 30 adhered to the side walls of the container 20 by the use of adhesive segments 34 that self adhere to opposing portions of the container side walls. The restraining strips 30 then extend to be wrapped around and embrace cargo 36, such as fifty five gallon drums 38. The restraining strips 30 overlap and are folded and drawn tightly together by a torque tool. Then an independent overlying patch segment 40 is applied to the junction to unite the opposing restraining strips 30 from the container side walls around the cargo to secure the cargo to the interior wall surfaces of the container 20.

Restraining Strip

Turning now to FIG. 3, the restraining strips 30 of the subject invention are preferably manufactured and transported on reels or rolls 44. A roll 44 of strips 30 are manufactured in an end-to-end continuous fashion in lengths of approximately twelve feet composed with a cross-weave reinforced construction in accordance with the subject invention. An initial, approximately seven foot segment, comprise the basis construction of the cross-weave restraining strip 46, which will be discussed in detail below, and alternate five foot segments 48 which includes an extra self-adhering adhesive component. In one embodiment the strips 30 are transversely perforated, at approximately twelve foot lengths, so that a strip 30 can be torn off or in any event can be facially cut to create a single approximately twelve foot length of restraining strip 30 for use on a job site. Preferably, the restraining strip 30 is fifteen inches in width; however, other widths may be substituted depending on the need for additional strength, which a wider strip can provide.

FIGS. 4 through 8 disclose detailed views of one preferred embodiment of the restraining strip 30. FIG. 4 shows an expanded, partially redacted, view to disclose the relative position of components of the restraining strip 30, in accordance with the subject invention. The restraining strip 30 includes a first cross-weave layer of reinforcement material 50 having a first surface 52 and a second surface 54. The cross-weave layer 50 is preferably composed with a plurality of substantially parallel longitudinal strands 56 extending along the length of the restraining strip 30, note again FIG. 3, and crossing strands 58. As shown particularly in FIGS. 5 and 6 the crossing strands 58 are woven into the longitudinal strands 56 and have a next adjacent spacing that is approximately twice the spacing of next adjacent parallel longitudinal strands 56.

The cross-weave restraining strip 30 includes a first adhesive layer 64 having a first surface or side 66 and a second surface or side 68. The first surface 66 of the first adhesive layer 64 overlays and bonds to the second surface 54 of the cross-weave layer 50.

Although a substrate may not be needed for the first adhesive layer 64 in the event a substrate is necessary or desirable a substrate 70 may be used as shown in FIG. 7. The substrate 70 but may be composed of an acrylic sheet having a plurality of transverse holes, a resin differential polymer with holes to render the substrate porous, or VALERON® which may be fashioned in the form of a screen foundation. Companies such as DuPont, Hoeschst Celanese, and others manufacture such materials. Alternatively, the substrate may not be porous provided that the shear strength of the adhesive materials is sufficient to carry axial loading as discussed below.

The first, cross-weave layer of reinforcement further includes an outer coating 60 which is adhere to the cross-weave and is preferably a thin layer of biaxially-oriented polyethylene terephthalate polyester film sold under the trademark MYLAR®, although other materials may be used. MYLAR® is a registered trademark of the DuPont Company of Wilmington, Del. The coating provides dimensional rigidity to the cross-weave and a protective clear or opaque coating.

As noted above, the substrate 70 is preferably porous and divides the first and second adhesive layers 72 and 74 which may operably penetrate through the substrate and self bond together. The adhesive layer 64 is composed of compositions that have high shear strength, wide operative temperature gradient—including cold weather tackiness and a specific gravity of less than one to displace moisture from the side walls of a container through capillary action. Adhesives of the type that are preferred are available from the Venture Tape Company of Rockland, Mass. In an alternative embodiment the substrate 70 may be composed of MYLAR® or some other relative non-porous material. In this embodiment the shear strength between the adhesive layers 72 and 74 are sufficient to transfer impact load forces to the reinforcing layers.

In addition to the first, cross-weave layer of reinforcement material 50 the subject invention includes a second, reinforcement layer 80 which is composed with a plurality of parallel strands 82.

As shown more particularly in FIG. 8 each of the strands 82 is composed of a plurality of finer denier strands 84 of reinforcing materials. The reinforcement strands 84 may be composed of fine polyester fibers, polypropylene, polyethylene, polyolefin, glass fiber, aramids including KEVLAR®, carbon fibers, and the like. KEVLAR® is a polyamide in which all the amide groups are separated by para-phenylene groups. KEVLAR® is a registered trademark of the DuPont Company of Wilmington, Del. Individual strand bundles 82 are directly abutted against and adhered to the second or outer surface 68 of the first adhesive layer 64 as shown in FIGS. 4 through 8.

In addition to the main body of the load restraining strip 30, which is continuous throughout the strip and comprises a cross-weave layer of reinforcement 50, a first adhesive layer 64, a second reinforcement layer 80 composed with parallel strands 82, as discussed above, the subject invention includes a length of an extra self-adhering material 48, note again FIG. 3.

The self-adhering segment 48 comprise a second layer of adhesive 90 having a first side 92 in direct self-adhering contact with an outer or second surface 84 of the second layer of reinforcement strands 80. The second layer of adhesive material 90 has a second, outer side 94 and a release paper 96 extends over the outer most surface 94 of the second layer of adhesive 90. The release paper 96 enables individual segments of the subject load restraining strip 30 to be manufactured on a reel core as shown in FIGS. 3 and 4 and the release paper 96 is peeled off of the load restraining strip 30 on site so that the second layer of adhesive 90 may be used by an installer to affix one end of the load restraining strip 30 to a side wall, or other attachment surface, of a transport container.

In a presently preferred embodiment, the second layer of adhesive 90, itself, is composed of a core or substrate member 98 and a first layer of adhesive 100 and a second layer of adhesive 102 overlaying opposite sides of the substrate 98. The substrate may be MYLAR® or a more porous material to enable the adhesive layers of the second adhesive layer to bond together.

In the embodiment of the invention depicted in FIG. 7 the thickness of the first 100 and second 102 layers are substantially the same. Turning now to FIG. 9 an alternative preferred embodiment of the invention is shown where a first, cross-weave layer 110 of a design and construction similar to layer 50 is bonded to one surface of a layer of adhesive 112 and a second, parallel strand layer of reinforcement 114 is bonded to the other surface of the adhesive course 112. In this embodiment an outer segment of adhesive material 116 is shown which longitudinally extends along the strip 30 for only a portion of the longitudinally extent as shown in FIG. 3. Again the second adhesive course 116 is shown as being composed of two layers of adhesive 118 and 120 coating either side of a substrate 122, such as MYLAR®. However, in this embodiment, the thickness of the inner layer of adhesive 118 has a thickness "A" that is greater than the thickness "B" of the outer layer 120 of adhesive of the second adhesive layer 116. In this embodiment the outermost layer 120 of adhesive is designed to be placed against a securement sidewall, or other container surface, which is relatively smooth compared with the outer surface of the second layer of reinforcement strands 114.

The subject invention is particularly designed to be used in either twenty or forty foot intermodal containers. These containers are ninety-two inches (seven feet, eight inches) wide, and ninety-two inches high. Although certain embodiments of the invention, such as depicted in FIG. 2 are adaptable to containers of all sizes, if a customer is exclusively using intermodal container having these dimensions, the adhesive from the glue line on the sidewall to the central overlapping portion would never be exposed during use. Thus, if the restraining strip is manufactured such that there is five feet of adhesive 48 and then seven feet 46 without extra adhesive, and repeating, the cost of adhesive could be reduced. However, it will be recognized by those of skill in the art that other lengths may be manufactured to meet the use objectives of a given client without departing from the concepts of the subject invention.

Method of Restraining Cargo

As more particularly described in applicant's previously noted U.S. Pat. Nos. 6,089,802 and 6,227,779 an improved load restraining strip 30, such as described above is one component of a load restraining system as described more fully in these patents. Briefly, however, and as illustrated in connection with FIG. 2, a pair of load restraining strips 30 are cut from a roll 44. The release paper 96 is removed from strip segment 48 and the strip 30 is applied to one side wall, or other interior surface, of a container 20, such as illustrated in FIG. 2. A second load restraining strip 30 is also applied to a directly opposing surface of the container. The free ends 46 of the opposing pair of load restraining strips 30 are wound together tightly with a torque tool, again, as specifically disclosed in the prior '802 and '779 patents. An overlaying patch segment 40 is then applied over the overlapped end segments 46 and the load is operably secured.

In the subject application, and in the claims, the term "transport container" is used as a generic expression for all forms of transport units that are capable of caring cargo. A transport container unit includes but is not limited to intermodal containers, railway cars—such as box cars, truck trailers, and the like Having described in detail preferred embodiments of the invention, it may be useful to briefly set forth some of the major advantages of the invention.

SUMMARY OF MAJOR ADVANTAGES OF THE INVENTION

This subject invention provides a uniquely cross-weave restraining strip, wherein the shear strength of the cross-weave and a second layer of parallel reinforcement strands bound together with an adhesive is sufficient to significantly enhance the tensile strength of the overall load restraining strip 30 and protect cargo from damage during transport.

This invention also provides an entirely self-contained load restraint system with an outer adhesive component 90 carried on the strip.

This invention provides an adhesive backed strip for restraining freight and cargo that has a wide operative temperature gradient so that it can withstand cargo transport through most climates.

This invention enables a cross-weave load restraining strip to safely secure an entire load or even a partial load and moreover, to accomplish this without having to brace, nail, anchor, strap, or bolt, thereby substantially reducing labor costs and installation time.

This invention still further provides a product for restraining a load having enhanced sheer strength and minimum peel resistance so that, upon arrival at the destination, it may be quickly removed and disposed of without leaving a residue on a container interior wall surface.

This invention yet further provides for superior gripping and restraining due to the adhesion to corrugated, interior walls of an intermodal container.

This invention provides enhanced axial resistance to elongation so that it may be used in a system for transporting hazardous materials, and the like. Further the invention envisions use of differential thickness "A" and "B" of an attachment portion 48 of the load restraining strip 30.

A particular advantage of the subject invention is the capability to secure full or partial loads with enhanced axial strength and resistance to elongation with only one cross-weave cross-weave product.

Another significant advantage of the subject invention is ability to customize the roll of polyester self-adhesive material to the needs of a particular customer.

Yet another significant advantage of the subject advantage is the strength of the barrier formed by the adhesive shear strength formed between a first, cross-weave and a second parallel strand layer of reinforcement components.

A further significant advantage of the subject invention is the ability to withstand the substantial force generated by restraining eighty fifty-five gallon drums, double stacked, in a twenty foot long container.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A load restraining strip for use in securing cargo within a transport container, which cargo is subject to shifting forces during transport, said load restraining strip comprising:

a first layer of reinforcement material having a first side and a second side and a first edge and a second edge and being composed of substantially parallel longitudinal strands extending along the length of said restraining strip;

a first adhesive layer having a first side and a second side and said first side of said first adhesive layer coextensively extending along, coating and bonding to said second side of said first layer of reinforcement material;

a second, parallel strand layer of reinforcement material having a first side and a second side, wherein said second side of said first adhesive layer is bonded to said first side of said second, parallel strand layer of reinforcement material;

a second layer of adhesive having a first side and a second side and at least partially extending along and coating a portion of one of said first side of said first strand layer of reinforcement material and said second side of said second strand layer of reinforcement material; and a release paper extending coextensively with and releasably adhered to the second side of said second layer of adhesive, wherein said release paper may be removed from said second layer of adhesive on site and said load restraining strip releasably affixed to an interior surface of a cargo transport container such that said load restraining strip may be used as a flexible securement element to secure cargo within a transport container.

2. A load restraining strip for use in securing cargo within a transport container as defined in claim 1, further comprising:
a plurality of crossing strands interwoven with said substantially parallel longitudinal strands of said first layer of reinforcement material to form a cross-weave layer.

3. A load restraining strip for use in securing cargo within a transport container as defined in claim 2 wherein said first layer of reinforcement material is formed such that:
spacing between next adjacent ones of said crossing strands of said first layer of reinforcement material is approximately twice as great as spacing between next adjacent strands of ones of said substantially parallel longitudinal strands.

4. A load restraining strip for use in securing cargo within a transport container as defined in claim 1 wherein said first layer of reinforcement material further comprises:
a pliant coating applied to an outer surface of one of said first layer of reinforcement material and said second layer of reinforcement material.

5. A load restraining strip for use in securing cargo within a transport container as defined in claim 4 wherein said pliant coating comprises:
a layer of biaxially-oriented polyethylene terephthalate polyester film.

6. A load restraining strip for use in securing cargo within a transport container as defined in claim 1 wherein said first adhesive layer includes:
a spun bonded polyester substrate located generally centrally within said first adhesive layer.

7. A load restraining strip for use in securing cargo within a transport container as defined in claim 1 wherein:
said substantially parallel longitudinal strands of said first layer of reinforcement material comprise a plurality of finer denier fibers of reinforcement material.

8. A load restraining strip for use in securing cargo within a transport container as defined in claim 7 wherein:
said strands of said second parallel strand layer of reinforcement material comprise a plurality of finer denier fibers of reinforcing material.

9. A load restraining strip for use in securing cargo within a transport container as defined in claim 7 or 8, wherein said finer denier fibers are composed of:
a combination of at least two different fibers selected from the group consisting of a polyester, polypropylene, polyethylene, polyolefin, glass fiber, aramid, carbon fiber and polyamide fibers with amide groups separated by para-phenylene groups.

10. A load restraining strip for use in securing cargo within a transport container as defined in claim 1, wherein said second layer of adhesive includes:
a substrate material having a first side and a second side;
a first course of adhesive covering said first side of said substrate material and adhered to said second side of said second, parallel strand layer of reinforcement material; and
a second course of adhesive covering said second side of said substrate material and being operable for adhering contact with an interior surface of a cargo transport container.

11. A load restraining strip for use in securing cargo within a transport container as defined in claim 10, wherein said substrate material comprises:
a strip of biaxially-oriented polyethylene terephthalate polyester film material.

12. A load restraining strip for use in securing cargo within a transport container as defined in claim 10, wherein:
said first course of adhesive of said second layer of adhesive is thicker than said second course of adhesive.

13. A load restraining strip for use in securing cargo within a transport container, which cargo is subject to shifting forces during transport, said load restraining strip comprising:
a first layer of reinforcement material having a first side and a second side and a first edge and a second edge and being composed of substantially parallel longitudinal strands extending along the length of said restraining strip;
a first adhesive layer having a first side and a second side and said first side of said first adhesive layer coextensively extending along, coating and bonding to said second side of said first layer of reinforcement material;
a second, parallel strand layer of reinforcement material having a first side and a second side, wherein said second side of said first adhesive layer is bonded to said first side of said second, parallel strand layer of reinforcement material;
a second layer of adhesive having a first side and a second side and at least partially extending along and coating a portion of one of said first side of said first layer of reinforcement material and said second side of said second strand layer of reinforcement material;
a pliant coating applied to one of said first side of said first layer of reinforcement material and said second side of said second strand layer of reinforcement material wherein said pliant coating is applied to the side opposite the second layer of adhesive; and
a release paper extending coextensively with and releasably adhered to the second side of said second layer of adhesive, wherein said release paper may be removed from said second layer of adhesive on site and said load restraining strip releasably affixed to an interior surface of a cargo transport container such that said load restraining strip may be used as a flexible securement element to secure cargo within a transport container.

14. A load restraining strip for use in securing cargo within a transport container as defined in claim 13, further comprising:
a plurality of crossing strands interwoven with said substantially parallel longitudinal strands of one of said first layer of reinforcement material and said second strand layer of reinforcement material to form a crossweave layer.

15. A load restraining strip for use in securing cargo within a transport container as defined in claim 14 wherein said cross-weave layer of reinforcement material is formed such that:
spacing between next adjacent ones of said crossing strands of said first layer of reinforcement material is approximately twice as great as spacing between next adjacent strands of ones of said substantially parallel longitudinal strands.

16. A load restraining strip for use in securing cargo within a transport container as defined in claim 13 wherein said pliant coating comprises:
a layer of biaxially-oriented polyethylene terephthalate polyester film.

17. A load restraining strip for use in securing cargo within a transport container as defined in claim 13 wherein said first adhesive layer includes:
a spun bonded polyester substrate located generally centrally within said first adhesive layer.

18. A load restraining strip for use in securing cargo within a transport container as defined in claim 13 wherein:
said substantially parallel longitudinal strands of said first layer of reinforcement material comprise a plurality of finer denier fibers of reinforcement material.

19. A load restraining strip for use in securing cargo within a transport container as defined in claim 13 wherein:
said strands of said second parallel strand layer of reinforcement material comprise a plurality of finer denier fibers of reinforcing material.

20. A load restraining strip for use in securing cargo within a transport container as defined in claim 18 or 19, wherein said finer denier fibers are composed of:
a combination of at least two different fibers selected from the group consisting of a polyester, polypropylene, polyethylene, polyolefin, glass fiber, aramid, carbon fiber and polyamide fibers with amide groups separated by para-phenylene groups.

21. A load restraining strip for use in securing cargo within a transport container as defined in claim 13, wherein said second layer of adhesive includes:
a substrate material having a first side and a second side;
a first course of adhesive covering said first side of said substrate material and adhered to said second side of said second, parallel strand layer of reinforcement material; and
a second course of adhesive covering said second side of said substrate material and being operable for adhering contact with an interior surface of a cargo transport container.

22. A load restraining strip for use in securing cargo within a transport container as defined in claim 21, wherein said substrate material comprises:
a strip of biaxially-oriented polyethylene terephthalate polyester film material.

23. A load restraining strip for use in securing cargo within a transport container as defined in claim 21, wherein:
said first course of adhesive of said second layer of adhesive is thicker than said second course of adhesive.

* * * * *